No. 627,570. Patented June 27, 1899.
J. H. CHASE.
PRIMARY VALVE FOR AUTOMATIC ORGANS.
(Application filed Apr. 20, 1898.)
(No Model.)
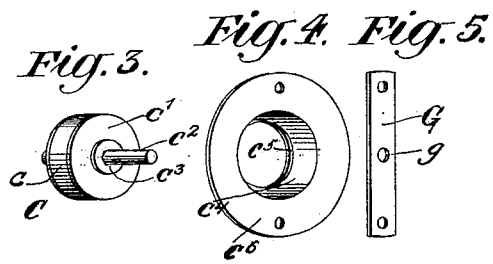
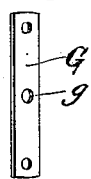
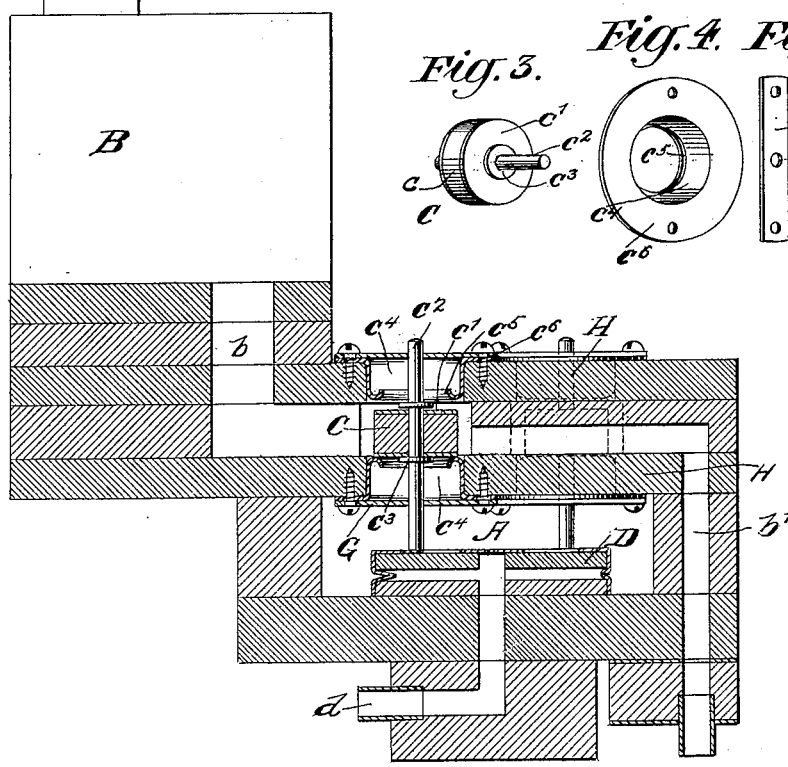
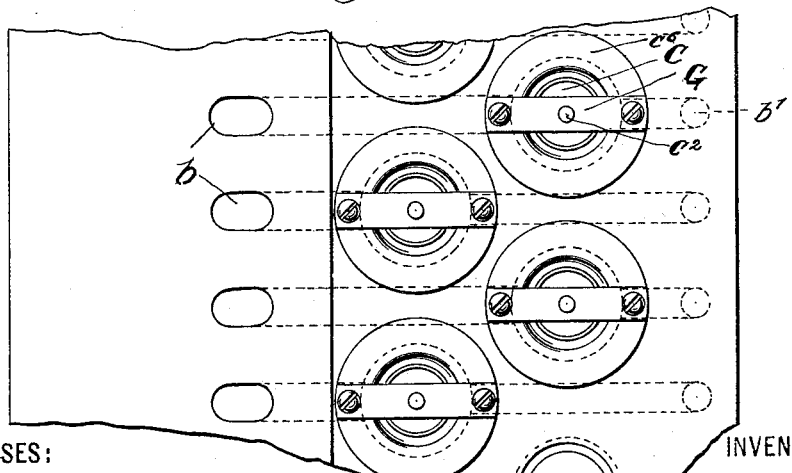
WITNESSES:
INVENTOR
Joseph H. Chase
BY
HIS ATTORNEY.
THE NORRIS PETERS CO., PHOTO-LITHO., WASHINGTON, D. C.

UNITED STATES PATENT OFFICE.

JOSEPH H. CHASE, OF MERIDEN, CONNECTICUT, ASSIGNOR TO THE AEOLIAN COMPANY, OF NEW YORK, N. Y.

PRIMARY VALVE FOR AUTOMATIC ORGANS.

SPECIFICATION forming part of Letters Patent No. 627,570, dated June 27, 1899.

Application filed April 20, 1898. Serial No. 678,215. (No model.)

*To all whom it may concern:*

Be it known that I, JOSEPH H. CHASE, a citizen of the United States, residing at Meriden, New Haven county, Connecticut, have invented a new and useful Improvement in Primary Valves for Automatic Organs, of which the following is a specification.

I will describe my invention in detail and then point out the novel features in the claims.

In the accompanying drawings, Figure 1 is a vertical sectional view of that portion of an automatic organ to which my invention is applied. Fig. 2 is a detail top view of the parts shown in Fig. 1. Figs. 3, 4, and 5 are each perspective views of a part of a primary valve.

A represents an exhaust chest or chamber of an automatic organ, with which a number of pneumatics, such as B, controlling sound-producing devices are in communication through passages, such as $b$.

$b'$ represents one of a number of passages between a subbase of an automatic organ and the exhaust. The passages $b$ $b'$ are controlled by primary valves C, each of which is operated by a pneumatic D. The pneumatics D are located in the exhaust, and each is at the head of a passage $d$, which leads from a tracker or keyboard from which the sound-producing devices are made to speak. Each of the primary valves in this instance consists of a disk $c$, provided on its upper and lower surfaces with a facing $c'$. The disk is loose upon a central stem $c^2$, which projects beyond each face of the disk; but it is confined between rings $c^3$, carried by the stem. The valve is adapted to work in the passages aforesaid and serves as a means for controlling the communication of these passages with the exhaust and also with the atmosphere. Removably secured in these communications, which in this instance are registered openings in opposite boards H, are removable valve-seats $c^4$. These seats are struck up or spun into a pit shape and have a central opening for the passage of air. Surrounding the opening in each seat is a rounded flange $c^5$, against which the valve bears to close the opening. The seats are also provided with an annular flange $c^6$, by which they are secured in place. A bar or strip G, having an opening $g$, through which the stem extends, is placed across each seat to serve as a guide for the valve-stem.

With this arrangement a simple primary-valve mechanism is provided that is easy of adjustment and accessible from the outside of the exhaust chest or chamber.

I claim as my invention—

1. In a musical instrument, the combination of an exhaust, a sound-producing device, a valve for controlling the passages from said sound-producing device to the exhaust and from the sound-producing device to the atmosphere, suitable means for moving the valve, said valve comprising a stem on which the valve is loosely fitted, collars on said stem for limiting the movement of the valve on the stem, and seats in the passages aforesaid against which the valve bears, substantially as described.

2. In a musical instrument, the combination of an exhaust, a sound-producing device, a valve for controlling the passages from said sound-producing device to the exhaust and from the sound-producing device to the atmosphere, suitable means for moving the valve, and seats in the aforesaid passages having flanges which are curved to present round surfaces against which the valve bears, substantially as described.

In testimony whereof I have signed my name to this specification in the presence of two subscribing witnesses.

JOSEPH H. CHASE.

Witnesses:
W. K. BRIGHAM,
A. C. BUMPUS.